US 9,377,377 B2

(12) United States Patent
Chen et al.

(10) Patent No.: US 9,377,377 B2
(45) Date of Patent: Jun. 28, 2016

(54) METHODS AND APPARATUS FOR MEASURING MULTIMODE OPTICAL FIBER BANDWIDTH

(71) Applicant: Corning Incorporated, Corning, NY (US)

(72) Inventors: Xin Chen, Corning, NY (US); Jason Edward Hurley, Corning, NY (US); Daniel Aloysius Nolan, Corning, NY (US); Richard Stephen Vodhanel, Red Bank, NJ (US)

(73) Assignee: Corning Incorporated, Corning, NY (US)

( * ) Notice: Subject to any disclaimer, the term of this patent is extended or adjusted under 35 U.S.C. 154(b) by 88 days.

(21) Appl. No.: 14/248,852

(22) Filed: Apr. 9, 2014

(65) Prior Publication Data

US 2014/0319354 A1    Oct. 30, 2014

Related U.S. Application Data

(60) Provisional application No. 61/817,499, filed on Apr. 30, 2013.

(51) Int. Cl.
*G01M 11/00* (2006.01)
*H04B 10/2581* (2013.01)
*H04B 10/073* (2013.01)

(52) U.S. Cl.
CPC .......... *G01M 11/333* (2013.01); *G01M 11/335* (2013.01); *H04B 10/0731* (2013.01); *H04B 10/2581* (2013.01)

(58) Field of Classification Search
None
See application file for complete search history.

(56) References Cited

U.S. PATENT DOCUMENTS

| | | | |
|---|---|---|---|
| 6,400,450 B1* | 6/2002 | Golowich | G01M 11/338 356/73.1 |
| 7,945,159 B2* | 5/2011 | Pape | H04B 10/0775 398/25 |
| 8,274,647 B2 | 9/2012 | Gholami et al. | |
| 8,797,519 B2* | 8/2014 | Chen | H04B 10/2581 356/73.1 |
| 2011/0054861 A1 | 3/2011 | Lane | |
| 2014/0226151 A1* | 8/2014 | Bennett | C03B 37/0253 356/73.1 |
| 2014/0318188 A1* | 10/2014 | Bowker | C03B 37/0253 65/378 |

OTHER PUBLICATIONS

PCT Application No. PCT/US2014/035632, filed Apr. 28, 2014, PCT Search Report dated Aug. 25, 2014.
L.G. Cohen, et al., "Frequency domain measurements of dispersion in multimode optical fibers", *Applied Physics Letters*, vol. 30, No. 1, Jan. 1, 1977, pp. 17-19.

(Continued)

*Primary Examiner* — Gordon J Stock, Jr.
(74) *Attorney, Agent, or Firm* — Svetlana Z. Short; Joseph Gortych

(57) ABSTRACT

Methods and apparatus for measuring the modal bandwidth of a multimode optical fiber as a function of wavelength are disclosed. The methods include emitting polarized light from a single-mode fiber, frequency-modulating the single-mode polarized light, and then conditioning the frequency-modulated polarized light to excite multiple modes of the multimode optical fiber. The multimode light transmitted by the multimode optical fiber is detected and analyzed by a network analyzer to determine a bandwidth for at least three different wavelengths. A controller performs a fit to the measured bandwidths using a fitting equation to determine the modal bandwidth as a function of wavelength.

19 Claims, 12 Drawing Sheets

(56) References Cited

OTHER PUBLICATIONS

L.G. Cohen, et al., "Profile Dispersion Effects on Transmission Bandwidths in Graded Index Optical Fibers", *IEEE Journal of Quantum Electronics*, vol. QE-14, No. 1, Jan. 1978, pp. 37-41.

"Optical Fibres. Part 1-41: Measurement methods and test procedures. Bandwidth = Fibres optiques", *International Standard—IEC*, vol. 60793-1-41, No. Ed. 3.0, Aug. 1, 2010, pp. 1-62.

R.E. Freund, et al., "High-Speed Transmission in Multimode Fibers", *Journal of Lightwave Technology*, vol. 28, No. 4, Feb. 15, 2010, pp. 569-586.

D. Marcuse, et al., "Fiber Bandwidth-Spectrum Studies", *Applied Optics*, vol. 18, No. 19, Oct. 1, 1979, pp. 3242-3248.

J.M. Williams, et al., "Measurement of variation of multimode fibre bandwidth with wavelength in 850 nm region using mode-locked Styryl dyw laser",*Electronics Letters*, vol. 24, No. 15, Jul. 21, 1988, pp. 923-925.

JIS C 6824 (2009) Test methods for bandwidth of multimode optical fibers.

IEC 60793-1-41 Ed. 3. 0: Optical Fibres: Part 1-41: Measurement methods and test procedures—Bandwidth (Jun. 26, 2009).

"Wavelength Stabilized Single Mode Fiber Coupled Laser Diode 5mW @ 808nm, QFBGLD-808-5." <i>QPhotonics—Laser Diodes</i>. QPhotonics, LLC, n.d. Web. 2013. <:http://www.qphotonics.com/Wavelength-stabilized-single-mode-fiber-coupled-laser-diode-5mW-808nm.html.

Wavelength Stabilized Single Mode Fiber Coupled Laser Diode 2mW @ 895nm , QFBGLD-895-2. QPhotonics—Laser Diodes. QPhotonics, LLC, n.d. Web. 2013. <http://www.qphotonics.com/Wavelength-stabilized-single-mode-fiber-coupled-laser-diode-2mW-895nm.html.

Wavelength Stabilized Single Mode Fiber Coupled Laser Diode 5mW @ 850nm, QFBGLD-850-5. QPhotonics—Laser Diodes. QPhotonics, LLC, n.d. Web. 2013. <http://www.qphotonics.com/Wavelength-stabilized-single-mode-fiber-coupled-laser-diode-5mW-850nm.html.

\* cited by examiner

METHODS AND APPARATUS FOR MEASURING MULTIMODE OPTICAL FIBER BANDWIDTH

CROSS-REFERENCE TO RELATED APPLICATIONS

This application claims the benefit of priority under 35 U.S.C. §119 of U.S. Provisional Application Ser. No. 61/817, 499 filed on Apr. 30, 2013 which application is incorporated herein by reference.

FIELD

The present disclosure relates to multimode optical fibers, and in particular relates to methods and apparatus for measuring the bandwidth of multimode optical fiber at multiple wavelengths.

BACKGROUND

Multimode fiber's information carrying capacity typically can be described in terms of a bandwidth length product (measured in units of MHz-km or GHz-km) that can be used to determine how far a system can operate at a given bit (data) rate. The data rate for multimode fiber and VCSEL-based short distance communications have increased from gigabit to 10 Gb/s, 16 Gb/s and 25 Gb/s or higher. The (absolute) bandwidth of a given multimode fiber with a specific length can be measured. The scaled bandwidth as determined by the bandwidth length product can be determined by multiplying the measured bandwidth with the length of multimode fiber measured to have the unit of GHz·km or MHz·km.

Presently, the main measurement method for measuring the bandwidth of multimode optical fibers is the differential mode delay (DMD) method. The measurement is done in the time domain by measuring the output of the pulse launched from a single mode fiber at the input end of the multimode fiber using various offsets of the single mode fiber relative to the multimode fiber core. The transfer function for various launch conditions can be determined from the DMD measurement and the bandwidth of the multimode fiber can be calculated.

Another method of measuring the bandwidth that is less widely used is the frequency-sweeping (FS) method. Both the DMD and FS methods provide a measurement of bandwidth for a single wavelength. In the FS method, a light source (e.g., laser diode) is used to inject light with narrow line width (e.g., 0.1 nm or even 0.05 nm) of a select amount of power into a test fiber. The laser is modulated from a low frequency (for an approximately zero reference level) to a high frequency (in excess of the 3 dB bandwidth). The relative output optical power is recorded as a function of the frequency. The input modulated signal launched into the test fiber is determined in a similar manner by measuring the output on a shorter reference length of fiber. The input and output powers as a function of frequency are then used to calculate the bandwidth.

One way to determine the bandwidth is to find the frequency for which the received signal power has dropped by 3 dB relative to the signal power at a low frequency. Such bandwidth is also often referred to as the "3 dB bandwidth." The bandwidth obtained from the FS method depends upon the launch conditions.

There is interest in using long-wavelength VCSELs in combination with multimode fiber. Multimode VCSEL based laser sources emit light at a wavelength between 840 nm and 860 nm at various data rates such as 1 Gb/s, 4.25/s, 10 Gb/s, 16 Gb/s and 25 Gb/s. Multimode optical fibers are also used with LEDs at wavelengths around 1300 nm and at relatively low data rates. The bandwidth of a multimode fiber is wavelength dependent. The wavelength dependency is determined by the material used for making the fiber and the refractive index profile of the fiber. To have a large bandwidth at around 850 nm, it is desirable the peak bandwidth of the multimode fiber to be centered at or near 850 nm. In addition, multimode optical fibers can be used at different wavelengths.

Consequently, it is important to know the bandwidth of multimode fibers at different wavelengths. Furthermore, detailed characterization of a multimode optical can be accomplished by using bandwidth data obtained at different wavelengths. To this end, it would be advantageous to have methods and apparatus that allow for quick and accurate bandwidth measurements of multimode optical fibers at different wavelengths.

SUMMARY

An aspect of the disclosure is method of measuring a modal bandwidth $BW(\lambda)$ as a function of wavelength of a multimode optical fiber under test. The method includes: a) emitting polarized light from a single-mode fiber connected to a light source light at a select wavelength within a wavelength range; b) frequency-modulating the polarized light over a range of frequencies to form frequency-modulated polarized light; c) exciting multiple modes of the multimode optical fiber under test using the frequency-modulated polarized light, and transmitting the multiple modes through the multimode optical fiber under test to form transmitted light; d) detecting the transmitted light and calculating a first bandwidth $BW_1$ based on the detected transmitted light at a first wavelength $\lambda_1$; and e) repeating acts a) through d) for two more select wavelengths within the wavelength range to calculate second and third bandwidths $BW_2$ and $BW_3$ at wavelengths $\lambda_2$ and $\lambda_3$.

Another aspect of the disclosure is a method of measuring a modal bandwidth $BW(\lambda)$ as a function of wavelength of a multimode optical fiber under test (FUT). The method includes: a) emitting polarized light of a first wavelength $\lambda_1$ from a single-mode fiber; b) frequency-modulating the single-mode polarized light; c) conditioning the frequency-modulated polarized light to excite multiple modes of the multimode FUT to form transmitted light; d) detecting and analyzing the transmitted light to determine a first bandwidth $BW_1$; and e) repeating acts a) through d) for at least two additional wavelengths $\lambda_2$ and $\lambda_3$ to determine second and third bandwidths $BW_1$ and $BW_2$.

The above methods optionally include using a bandwidth fitting equation to establish the modal bandwidth $BW(\lambda)$.

The above methods optionally include using a bandwidth fitting equation to establish the modal bandwidth $BW(\lambda)$.

Another aspect of the disclosure is an apparatus for determining a modal bandwidth $BW(\lambda)$ as a function of wavelength of a multimode optical fiber under test that has input and output ends. The apparatus includes: a tunable light source adapted to emit light at first, second and third wavelengths $\lambda_1$, $\lambda_2$ and $\lambda_3$ within a wavelength range; a single-mode optical fiber having an input end optically coupled to the light source to receive the light an output end that emits single-mode light; an optical modulator optically coupled to an output end of the single-mode optical fiber and that is operable to frequency modulate the single-mode light to form frequency modulated light in response to a frequency control signal; a mode conditioner optically coupled to the optical modulator and to the input end of the optical fiber under test, the mode conditioner being operable to receive and condition the frequency-modulated light to excite multiple modes of the optical fiber under test to form transmitted light; a photodetector optically coupled to the output end of the fiber under test and configured to receive the transmitted light and generate a detector signal representative of the transmitted light; a network analyzer electrically connected to the photodetector and to the optical modulator and configured provide the frequency control signal to the optical modulator and configured to receive and process the detector signal to calculate bandwidth values $BW_1$, $BW_2$ and $BW_3$ corresponding to the first, second and third wavelengths $\lambda_1$, $\lambda_2$ and $\lambda_3$; and a controller operably connected to the network analyzer and configured with instructions embodied in a computer-readable medium to cause the controller to perform a fit to a bandwidth fitting equation to define the bandwidth $BW(\lambda)$.

In addition, when making a very high bandwidth measurement, the network analyzer can be configured to do more averaging, smoothing and/or filtering. The measurement can be more reliable. Measurements of very high bandwidth may take longer, e.g., multiple seconds to around a minute to complete.

A fourth advantage is that the bandwidth measurement can be utilized for a wide variety of wavelength ranges other than the ones normally used in bandwidth measurements, which is typically a wavelength around 850 nm.

A fifth advantage is that various launch conditions can be created to emulate a wide range of real laser sources.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

The "bandwidth" is abbreviated BW and unless otherwise noted refers to the "modal bandwidth," which is measured in units of (frequency)·(distance), e.g., GHz·km, MHz·km. The bandwidth can also be specified at a specific value in the unit of MHz or GHz for a given length, and such use will be apparent from the context of the discussion.

The abbreviation $BW(\lambda)$ used to denote the dependency of the bandwidth BW with wavelength. The term "bandwidth as a function of wavelength" includes both discrete and continuous functions of wavelength. As discussed below, the continuous function of wavelength is derived using a bandwidth fitting curve.

Figure 1:
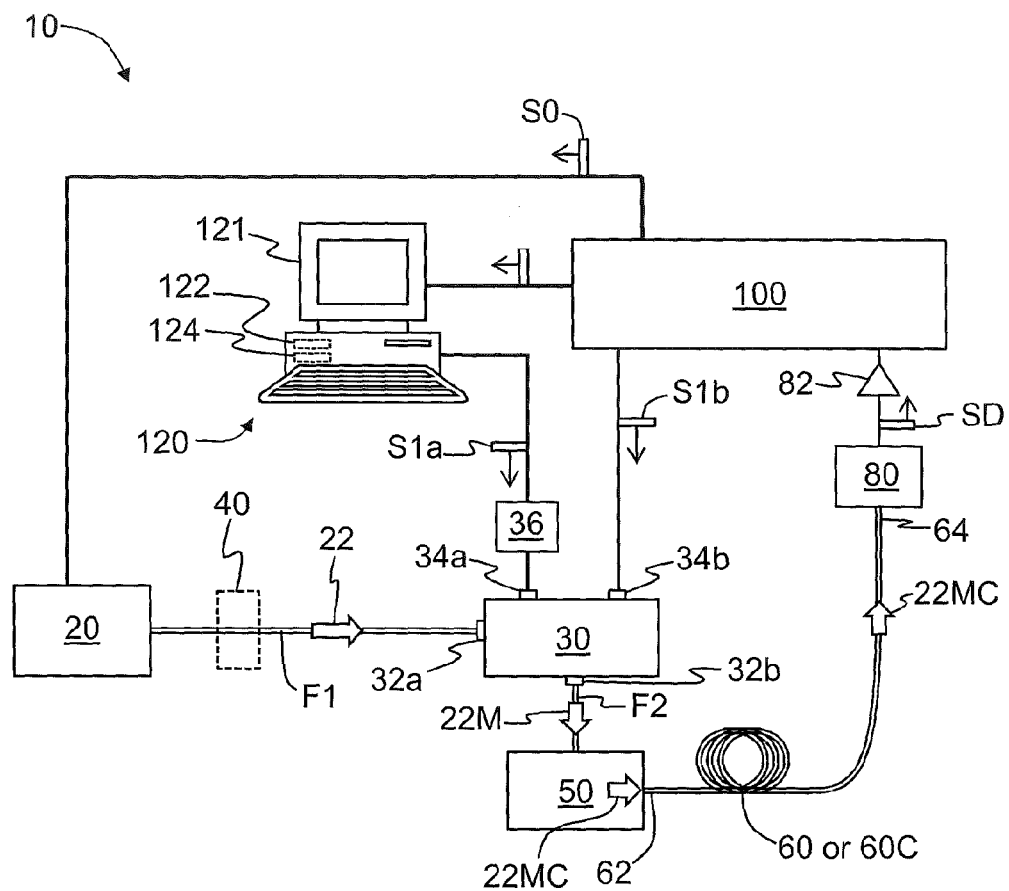
FIG. 1 is a schematic diagram of an example bandwidth-measurement apparatus according to the disclosure.

FIG. 1 is a schematic diagram of an example bandwidth-measurement apparatus ("apparatus") 10. Apparatus 10 includes a tunable light source 20. In an example, tunable light source 20 emits light 22 having select (central) wavelength $\lambda$ and a narrow spectral width $\delta\lambda$. In one example, $\delta\lambda \leq 0.1$ nm or less, while in another example $\delta\lambda \leq 0.05$ nm, while in yet another example, $\delta\lambda \leq 0.02$ nm.

In an example embodiment, tunable light source 20 is tunable over a wavelength range $\Delta\lambda$, which in various example $\Delta\lambda \geq 50$ nm, $\Delta\lambda \geq 70$ nm and $\Delta\lambda \geq 80$ nm. In an example, 50 nm $\leq \Delta\lambda \leq 150$ nm. Also in an example embodiment, tunable light source 20 can generate light 22 at three wavelengths $\lambda_1$, $\lambda_2$ and $\lambda_3$ that in various examples are separated from each other by at least 4 nm, or by at least 10 nm, or by at least 15 nm apart. In various examples, the tunable wavelength range can reside between the wavelengths of 800 nm and 1650 nm. Example wavelength ranges extend from 790 nm to 880 nm or 990 nm to 1070 nm, or 1260 nm to 1360 nm, or 1400 nm to 1550 nm, or 1500 nm to 1650 nm. Example embodiments of tunable light source 20 are discussed below.

In an example, the wavelength range Δλ is 50 nm to 150 nm wide and resides within a wavelength window between 750 nm and 1650 nm. In other examples, the wavelength window is 790 nm to 890 nm or 1260 nm to 1360 nm or 1450 nm to 1600 nm.

Tunable light source 20 also includes an optical modulator 30 having an input optical port 32a and an output optical port 32b. First optical fiber section F1 is optically coupled to input optical port 32a. An example optical modulator is a lithium-niobate-based modulator. In an example, tunable light source 20 includes a pigtail fiber (not shown) that is optically coupled to first optical fiber section F1.

In an example embodiment, first optical fiber section F1 is polarization-maintaining with its state of polarization aligned such that no additional polarization management is needed. In another example where first optical fiber section F1 is not polarization maintaining, a polarization controller 40 (dashed-line box) can be operably arranged in the first optical fiber section between light source 20 and modulator 30.

In an example, modulator 30 includes two electric ports 34a and 34b. The two electrical ports 34a and 34b are used to set a DC bias control voltage and provide RF driving signals, respectively. A power supply 36, which sets the DC bias control voltage, is electrically connected to electric port 34a and a network analyzer 100 is electrically connected to electric port 34b.

Apparatus 10 further includes a mode conditioner 50 optically coupled to output end 34 of light modulator 30 via a second single-mode optical fiber section F2. An example mode conditioner 50 can have any one of a number of commercially available mode conditioners. Another type of mode conditioner 50 is described in greater detail below.

Mode conditioner 50 in turn is optically coupled to at an input end 62 of a multimode optical fiber 60 whose BW is to be measured (hereinafter, "fiber under test" or FUT 60). In an example, FUT 60 has a select length, e.g., 1 km or many other lengths of choices, such as 100 m, 300 m, 2.2 km, 5.6 km, 8.8 km or even 16.5 km. Thus, in an example, FUT has a length in the range from 100 m to 16.5 km.

The FUT 60 includes an output end 64 that is optically coupled to a photodetector 80. Photodetector 80 is electrically connected to network analyzer 100 and generates a detector signals SD. In an example, photodetector 80 includes an internal linear amplifier (not shown) to boost the strength of detector signals SD. In another example, an external linear amplifier 82 disposed between the photodetector and network analyzer 100 is also used to further boost the strength of detector signals SD.

Network analyzer 100 is also electrically connected to power supply 36, which in turn is connected to electrical port 34a of optical modulator 30.

Apparatus 10 also includes a computer 120 that is electrically connected to network analyzer 100. Computer 120 can also be electrically connected to tunable light source 20 to control the operation of this light source.

Computer 120 includes a display 121. In an example, computer 120 comprises a computer or like machine that is adapted (e.g., via instructions such as software embodied in a computer-readable or machine-readable medium) to cause the computer to control the operation of the various components of the system 10. Computer 120 includes a processor unit ("processor") 122 and a memory unit ("memory") 124. An example computer 120 is or includes a computer with a processor and includes an operating system such as Microsoft WINDOWS or LINUX or Apple's OS X.

Computer is operably connected to various parts of the measurement setup such as connected to network analyzer, bias voltage control power supper for modulator and tunable light source in order to control the wavelength for light source, bias voltage of modulator, change settings for network analyzer and obtain data from network analyzer.

In an example embodiment, the processor 122 is or includes any processor or device capable of executing a series of software instructions and includes, without limitation, a general- or special-purpose microprocessor, finite state machine, computer, computer, central-processing unit (CPU), field-programmable gate array (FPGA) or digital signal processor The memory 124 is operably connected to the processor 122. As used herein, the term "memory" refers to any processor-readable medium, including but not limited to RAM, ROM, EPROM, PROM, EEPROM, disk, floppy disk, hard disk, CD-ROM, DVD or the like, on which may be stored a series of instructions executable by the processor 122. In an example embodiment, the system computer 120.

The measurement methods described herein may be implemented in various embodiments in a machine-readable medium (e.g., memory 124) comprising machine readable instructions (e.g., computer programs and/or software modules) for causing computer 120 to perform the measurement methods described herein by controlling the operation of apparatus 10. In an example embodiment, the computer programs run on processor 122 out of memory 124.

The computer programs and/or software modules may comprise multiple modules or objects in order to perform the various methods of the present disclosure and to control the operation and function of the various components of apparatus 10. The type of computer programming languages used for the code may range from procedural code-type languages to object-oriented languages. The files or objects need not have a one-to-one correspondence to the modules or method steps described. Further, the method and system may comprise combinations of software, hardware and firmware. Firmware can be downloaded into processor 122 for implementing the various example embodiments disclosed herein.

Computer 120 also includes software that causes processor 122 to process BW measurement data to calculate the BW as a function of wavelength (i.e., BW(λ)) based on fitting the BW data to the following general equation:

$$BW(\lambda)=f(\lambda) \qquad \text{EQ. 1}$$

Figure 2:
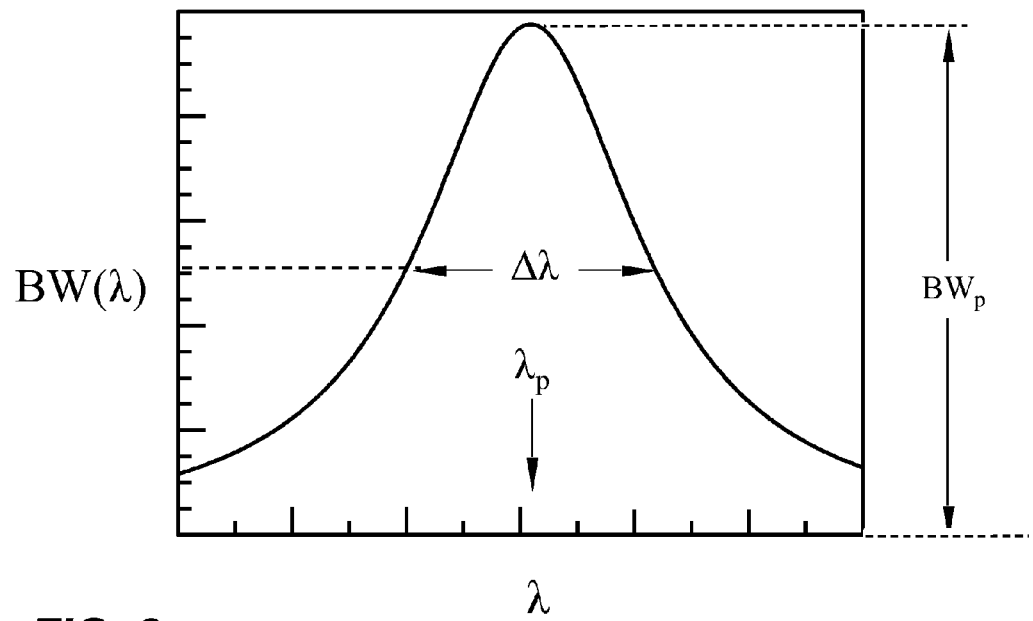
FIG. 2 is a an example plot of bandwidth $BW(\lambda)$ vs wavelength $\lambda$, that shows such an example function $f(\lambda)$, where $f(\square)$ has a peak bandwidth $BW_p$ at a (peak) wavelength $\lambda_p$, and has a specific width $\Delta\lambda$ at an example height of $(0.5) \cdot BW_p$.

FIG. 2 is a an example plot of bandwidth BW(λ) vs wavelength λ that shows such an example function f(λ), where f(λ) has a peak bandwidth $BW_p$ at a (peak) wavelength $\lambda_p$, and has a specific width Δλ at a select height such as $(0.3) \cdot BW_p$ or $(0.5) \cdot BW_p$ (as shown). The select height is a select fraction of the peak value of the function, i.e., of the peak bandwidth $BW_p$.

A specific example of a fitting equation based on the generalized form of the fitting equation:

$$BW(\lambda)=(0.2)/[a+c\cdot(\lambda-\lambda_p)^2] \qquad \text{EQ. 2}$$

where a and c are constants, λ is the measurement wavelength, and $\lambda_p$ is the peak wavelength, i.e., the wavelength λ where BW(λ) is maximum. The example fitting equation of EQ. 2 is derived from a Gaussian model for a multimode optical fiber. It accounts for the fact that in an actual multimode optical fiber there is a finite value of the bandwidth of 0.2/a due to non-alpha error in the fiber. Here, "alpha" refers to the alpha parameter of a multimode optical fiber, as discussed below. The non-alpha error also affects the width of the BW curve through the parameter c

Method of Operation

In an example of the operation of apparatus 10, controller 120 sends a control signal S0 to tunable light source 20 that causes the tunable light source to emit light 22 having a first wavelength $\lambda_1$. In another example, tunable light source 20 is controlled manually rather than via computer 120. In one example embodiment, first wavelength $\lambda_1$ can be about 807 nm, while subsequent wavelengths $\lambda_2$ and $\lambda_3$ can be about 850 nm and 894 nm, respectively.

Light 22 travels through optical modulator 30, which is electrically controlled by controller 120 and network analyzer 100 via power supply 36. A bias control voltage is set for optical modulator 30 by power supply 36 via a control signal S1a from controller 120. The bias voltage can be wavelength dependent, in which case it needs to be set for the optimal value for each wavelength. The optimal bias voltage can determined beforehand and input into controller 120. Controller 120 can then control power supply 36 to deliver the proper bias voltage through the use of a standard control interface, such as GPIB, USB or RS-232. Alternatively, an automatic bias control circuits (not shown) can be employed to set the bias voltage automatically by monitoring the input and output light as tapped from a couple fiber splitters (not shown).

Network analyzer 100 provides a frequency control signal S1b (e.g., a RF drive signal) to optical modulator 30 to sweep the modulation frequency over a select range frequency range $\Delta f = f_H - f_L$ wherein $f_H$ is the highest frequency in the range and $f_L$ is the lowest frequency in the range. In example embodiments, the lowest frequency $f_L$ of frequency range $\Delta f$ is 10 Khz or 100 KHz or 500 KHz or 1 MHz or 5 MHz or 10 MHz or 20 Mhz or any number in between. Also in example embodiments, the highest frequency $f_H$ of frequency range $\Delta f$ is 100 MHz, or 500 MHz, or 1 GHz, or 10 GHz or 20 GHz or 40 GHz or 60 GHz or any number in between.

Thus, control signals S1a and S1b from controller 120 and network analyzer 100 are used to control modulator 30 so that the modulator converts light 22 into modulated light 22M. Modulated light 22M then passes through fiber section F2 and then through mode conditioner 50. Mode conditioner 50 is configured to recondition modulated light 22M from its single-mode light distribution into a multi-mode light distribution suitable for launching into the multimode FUT 60. Thus, modulated light 22M exits mode conditioner 50 and enters the input end 62 of FUT 60 as mode-conditioned modulated light 22MC.

The mode-conditioned light 22MC travels through FUT 60 as a guided wave that travels in the multiple modes, and then exits the FUT at output end 64. The outputted light from the FUT 60 is then detected by photodetector 80. Photodetector 80 received and converts the light outputted by FUT signals to detector/electrical signal SD. In an example, detector signal is amplified either within photodetector 80 or by external linear amplifier 82. The detector signal SD is then provided to and analyzed by network analyzer 100.

The optical fiber transfer function (OFTF) of the FUT 60 is needed to calculate the bandwidth at a given wavelength. The OFTF is in general a complex function. The amplitude of the OFTF is used and plotted in log scale calculated using 20·log( ). The 20·log( ) operator has units of "electric dB." In the optical domain, the operator 10·log( ) is used to obtain a log scale, and this operator has units of "optical dB." The bandwidth of a multimode fiber is determined at the 3 optical dB or 6 electric dB below the signal level near the zero modulation frequency. The OFTF is also referred to as the S21 (or $S_{21}$) parameter.

A raw measurement of the OFTF using apparatus 10 includes contributions from the FUT 60 as well as contributions from the rest of the apparatus. Consequently, apparatus 10 needs to be operated in a calibration mode that serves to identify and separate the FUT and non-FUT contributions to the OFTF.

Thus, in an example, before FUT 60 is inserted into apparatus 10, a short piece of multimode fiber, i.e. less than 2 m, is used to optically connect mode conditioner 50 with photodetector 80. This fiber is sufficiently short so that it does substantially contribute a fiber component to the OFTF. The short fiber is referred to hereafter as a calibration fiber and is denoted 60C.

Calibration runs are performed for apparatus 10 using calibration fiber 60C. The calibrations runs are performed for the respective wavelengths to be used when measuring FUT 60. The calibration serves to identify and separate the bandwidth limitations due to the components of apparatus 10 from those of FUT 60.

The OFTF as determined by this calibration setup is referred to as the calibration OFTF and is denoted hereinafter as $ST_C(f)$. The amplitude of the calibration OFTF is $|ST_C(f)|$. Note that $|ST_C(f)|$ can either be expressed in its original scale or converted into in log scale or dB units.

Figure 3:
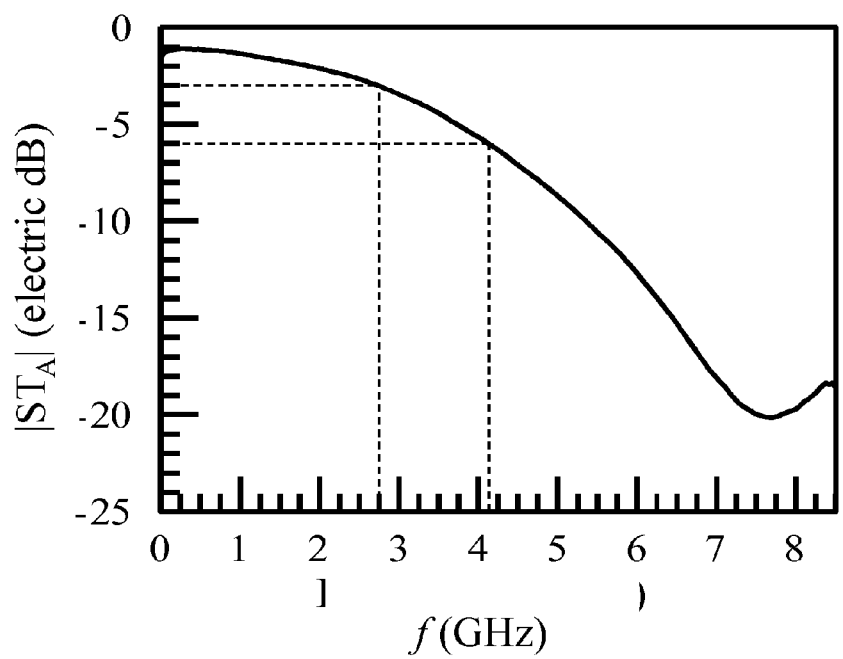
FIG. 3 is an example optical fiber transfer function that plots the adjusted optical fiber transfer function $ST_A(f)$ (in electrical dB) vs. frequency $f$ (in GHz)

The calibration data is saved and is loaded for a specific wavelength in network analyzer 100 when FUT 60 is inserted into apparatus 10. When FUT 60 is inserted, then the OFTF for FUT 60 at each wavelength is obtained with the calibration data loaded in network analyzer 100. The raw OFTF with FUT 60, or the OFTF that includes FUT and non-FUT contributions is denoted as $ST_R(f)$, while the adjusted OFTF that accounts for the calibration of apparatus 10 is denoted $ST_A(f)$. The amplitude of the adjusted OFTF is expressed as $|ST_A(f)|=|ST_R(f)|/|ST_C(f)|$ in linear scale or $|ST_A(f)|=|ST_R(f)|-|ST_C(f)|$ when converted into log scale. FIG. 3 is plots an example $|ST_A(f)|$ (electric dB) obtained from a 250 meter multimode optical fiber with a bandwidth BW=1033 MHz·km at 850 nm when proper calibration is done.

When the calibration data is loaded into network analyzer 100, the OFTF for FUT 60 is calculated and displayed directly as the adjusted OFTF or $ST_A(f)$.

The BW of FUT 60 at wavelength $\lambda_1$ can be extracted from the adjusted OFTF $ST_A(f)$ by defining a select attenuation threshold, e.g., at the 6 electrical dB (or 3 optical dB) point. This bandwidth can be labeled $BW_1$. In some other embodiments, the frequency associated with the drop of 3 electric dB or 1.5 optical dB can be extracted and multiplied by a coefficient to predict the value at 6 electrical dB (or 3 optical dB) point without having to obtain the actual value at 6 electrical dB (or 3 optical dB) point.

Once $BW_1$ is determined (or the data to calculate $BW_1$ is determined), then tunable light source 20 in apparatus 10 is adjusted so that it emits light 22 at wavelength $\lambda_2$, and the above process is repeated to obtain bandwidth $BW_2$ at second wavelength $\lambda_2$. This process is then repeated a third time to obtain bandwidth $BW_3$ at third wavelength.

Once bandwidths $BW_1$, $BW_2$ and $BW_3$ are obtained, then EQ. 1 is used to calculate the bandwidth $BW(\lambda)$ by a best-fit to the values of $BW_1$, $BW_2$ and $BW_3$ using EQ. 1 or its variants.

Figure 4:
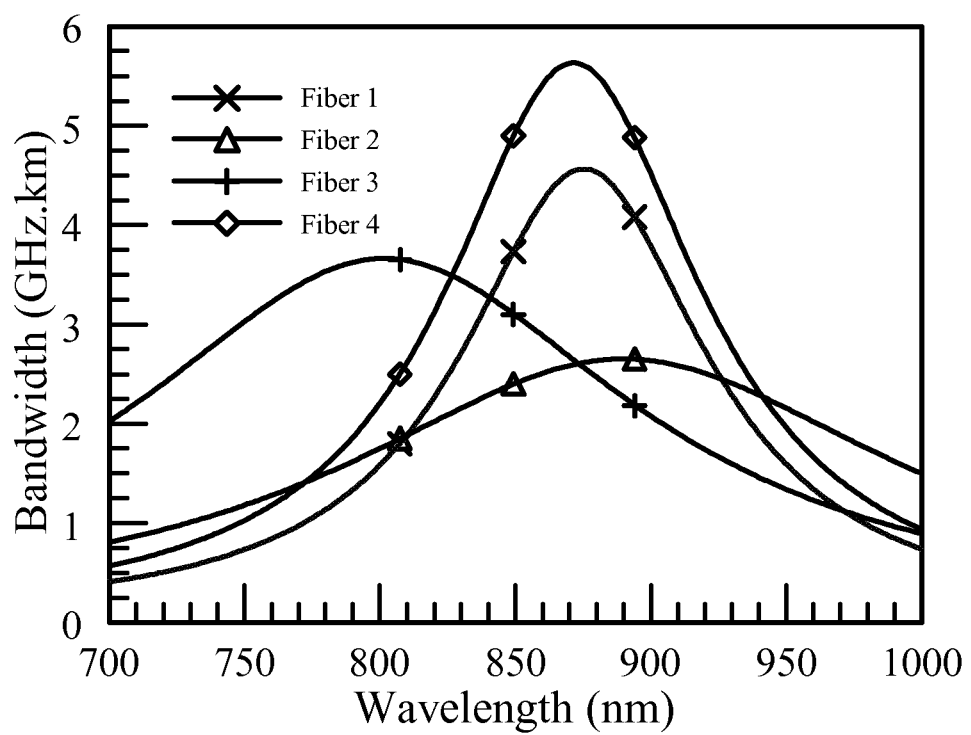
FIG. 4 is a plot of the bandwidth $BW(\lambda)$ (in GHz·km) vs. wavelength $\lambda$ (nm) based on measurements obtained for four different multimode optical fibers and then fitting the data for each fiber to a bandwidth equation.

FIG. 4 is a plot of $BW(\lambda)$ (in GHz·km) vs. wavelength (nm) based on measurements obtained for four different multimode optical fibers 60 (Fibers 1 through 4, as noted in the legend) and fitting the data for each fiber to fitting EQ. 2 above. Measurements were taken at $\lambda_1$=807.4 nm, $\lambda_2$=849.3 nm and $\lambda_3$=894.1 nm. The fit for each BW curve was performed over a wavelength range from 700 nm to 1000 nm.

Table 1 below sets forth some of the data represented in the bandwidth plot of FIG. 4. The parameter MinEMBc stands for the minimum calculated effective modal bandwidth BW and has units of GHz·km. The value "minEMBc" is derived using a method of calculating bandwidth from measurement from differential mode delay and is determined from the minimum value of bandwidth from a set of assumed laser launch conditions and can be used to compare to the measured values of BW. Typically, the bandwidth from a particular launch condition is equal or higher than the minimum value from the set of bandwidths. The BW units are in GHz·km and the peak wavelength $\lambda_p$ has units of nm. The maximum or peak bandwidth $BW_p$ occurs at the peak wavelength $\lambda_p$ and is sometimes referred to as "Lambda_P" or "lambda_p."

TABLE 1

| FIBER # | MinEMBc | $BW_1$ | $BW_2$ | $BW_3$ | $\lambda_p$ | $BW_p$ |
|---|---|---|---|---|---|---|
| 1 | 3.4321 | 1.8 | 3.73 | 4.08 | 875.2 | 4.57 |
| 2 | 2.709 | 1.85 | 2.4 | 2.65 | 890 | 2.65 |
| 3 | 3.205 | 3.65 | 3.1 | 2.18 | 801.6 | 3.66 |
| 4 | 5.460 | 2.5 | 4.9 | 4.88 | 871.5 | 5.63 |

Figure 5:
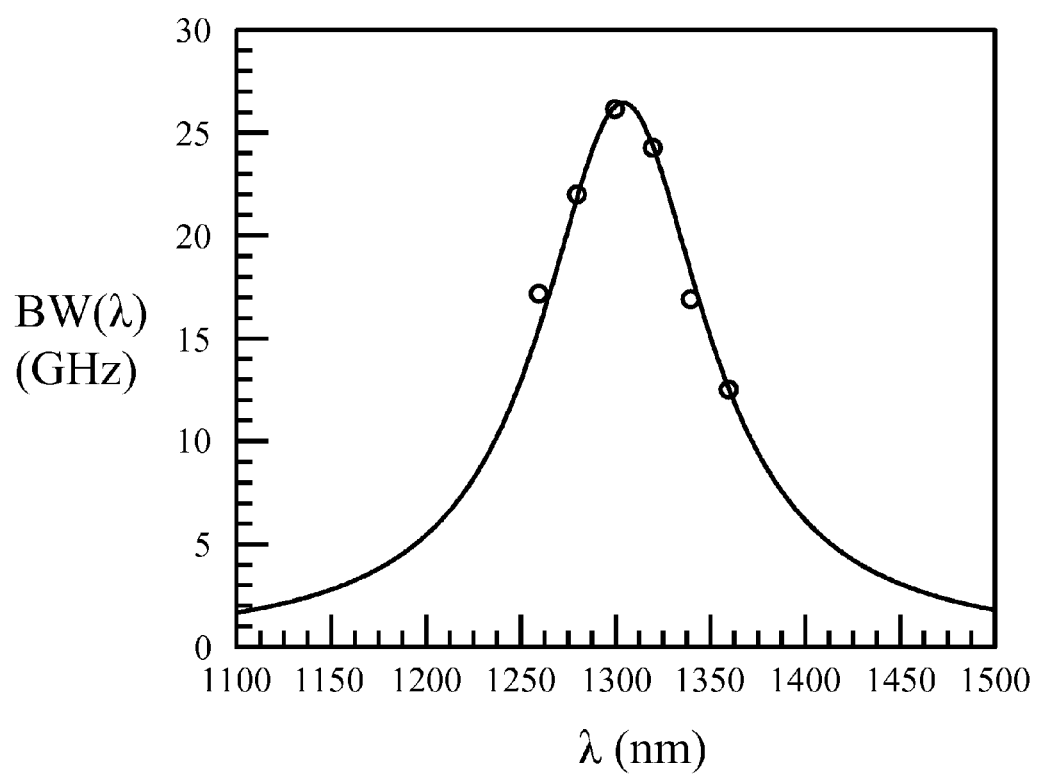
FIG. 5 is a plot similar to FIG. 2 and illustrates example bandwidth measurements for a 410 m length of multimode fiber designed for the operating wavelength range in six discrete wavelengths of 1260 nm, 1280 nm, 1300 nm, 1320 nm, 1340 nm and 1360 nm, wherein the data were fitted using the fitting equation (EQ 2), as set forth below.

In another example, a tunable laser operating at 1260-1360 nm and modulator working in that wavelength range are employed to conduct bandwidth measurements $BW_1$ through $BW_6$ for 410 m of multimode fiber 60 designed for the operating wavelength range in six discrete wavelengths of 1260 nm, 1280 nm, 1300 nm, 1320 nm, 1340 nm and 1360 nm using a ModCon mode conditioner 50, sold by Arden Photonics, Ltd., West Midland, United Kingdom. The data is fitted using EQ. 2 with the fitted curve, as shown in FIG. 5. The data fitting illustrates that this fiber has a peak wavelength of 1304 nm and peak bandwidth of 26.45 GHz at 410 m length, or 10.84 GHz·km using bandwidth length product.

Figure 6:
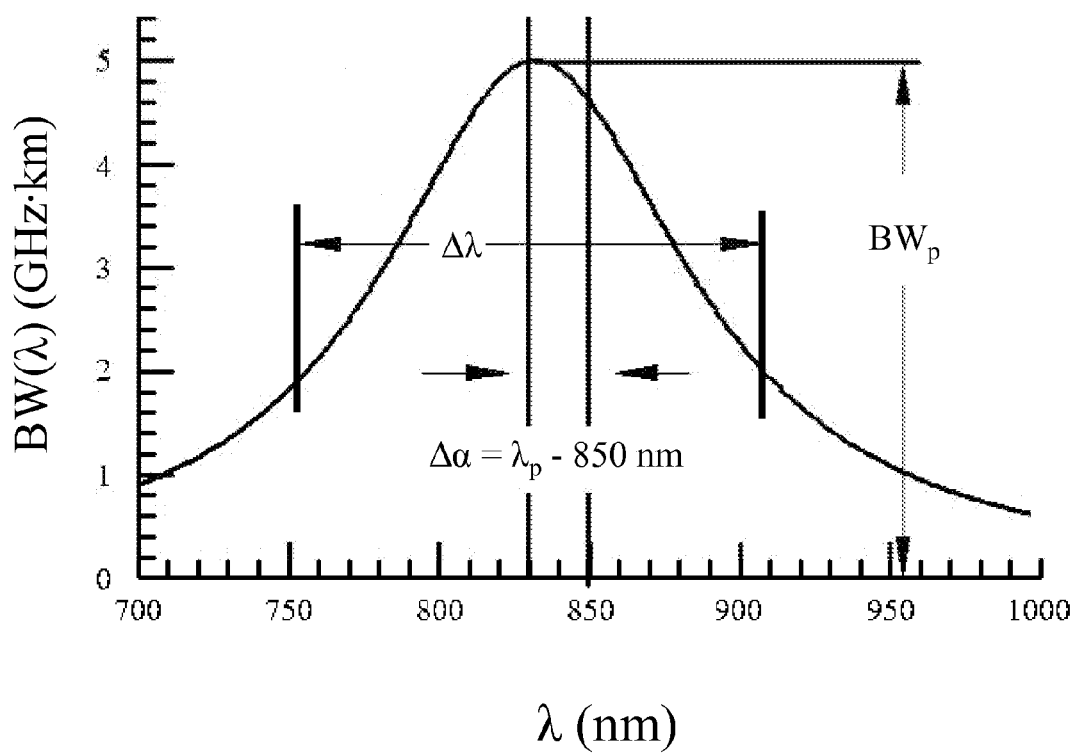
FIG. 6 is an example plot of the bandwidth $BW(\lambda)$ similar to that of FIG. 3, but for one multimode fiber, illustrating how alpha-errors and non-alpha errors in the fiber can be determined from the plot.

A given plot of BW($\lambda$) vs. wavelength $\lambda$ such as shown in FIG. 6 be used to determine different types of error-related parameters of FUT 60. For example, gradient multimode optical fibers have an "alpha profile" based on the aforementioned $\alpha$ parameter, wherein the optimum value of $\alpha=2.1$ at the peak wavelength $\lambda_p$ right around 850 nm. Differences in certain parameter values from their ideal values can be attributed to errors in the value of $\alpha$ relative to its ideal value and are called "alpha errors." Differences in the value of $\alpha$ from its optimum value reflect shortcomings in the manufacturing process. Other parameter errors that do not relate to the alpha parameter are referred to as "non-alpha errors," and are local deviation from the ideal alpha profile.

The plot of FIG. 6 shows how the measured peak wavelength $\lambda_p$, which is illustratively set at 840 nm deviates from its ideal peak wavelength $\lambda_p$, of 850 nm. This difference is consequence of the alpha value differing from its optimum value of 2.1. FIG. 6 also shows the maximum or peak bandwidth $BW_p$, the variation of which from its optimum value is a consequence of a non-alpha error, e.g., localized refractive index profile variations. A second non-alpha parameter variation that can be measured is the width $\Delta\lambda$ of the BW curve as taken at a select BW value, e.g., 2 GHz·km.

For a multimode optical fiber 60, the greater the BW, the smaller the $\Delta\lambda$. This feature can be seen also in the BW plots for the four example FUTs 60 of FIG. 4. Alternatively, one can characterize the width of the curve using a different measure, for example, as determined by the wavelength range when the bandwidth drops by a certain percentage, for example, by 30% from its peak value.

The apparatus and methods disclosed herein are not amenable to employing the type of light sources generally employed in the conventional apparatus and methods for measuring BW at a single wavelength. The usual light source used in conventional apparatus and methods is a VCSEL. However, VSCELs usually have a relatively large linewidth, e.g., greater than 0.3 or greater than 0.35 nm RMS in some cases. Such a linewidth would give rise to chromatic dispersion that would interfere with the bandwidth measurement at various wavelengths. Also, it is very difficult if not impossible to find various VCSELs with a wavelength that can vary in the range from 800 to 900 nm.

Moreover, the light source in a conventional BW measurement apparatus is directly modulated. Such light sources typically do not emit over a suitably wide range of wavelengths and/or cannot be modulated directly at high speed. Therefore, the conventional BW-measuring apparatus and methods cannot simply be scaled to perform multi-wavelength BW measurements.

Figure 7:
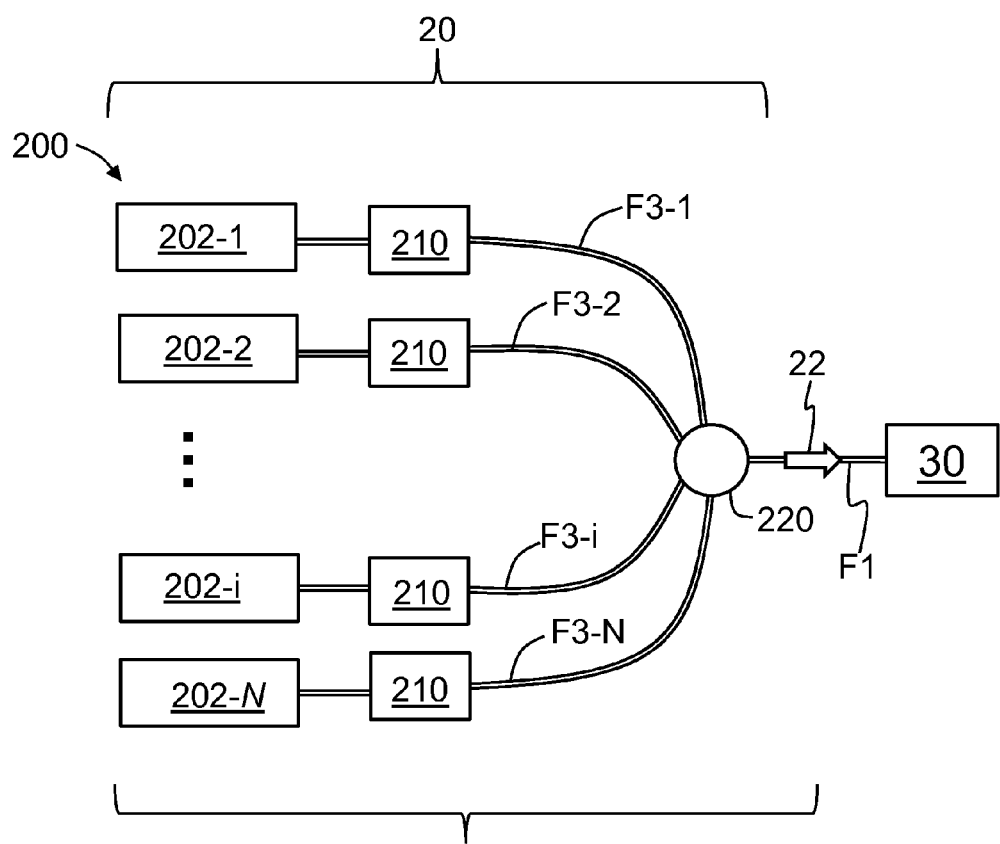
FIG. 7 is a close-up schematic diagram of an example light source that includes an array of N single-mode lasers that emits light of wavelengths $\lambda_1, \lambda_2, \ldots \lambda_i, \lambda_N$, respectively.

FIG. 7 is a close-up schematic diagram of an example light source 20 that includes an array 200 of N single-mode lasers 202, denoted 202-1, 202-2, ... 202-i, 202-N that correspond to wavelengths $\lambda_1, \lambda_2, \ldots \lambda_i, \lambda_N$, respectively. Single-mode lasers 202 are optically coupled to a N×1 optical switch 220 via respective single-mode optical fiber sections F3, namely F3-1, F3-2, ... F3-i, F3-N. In an example where the optical fiber sections F3 are not polarization maintaining, light source 20 includes polarization controllers 210 arranged in each optical fiber section F3.

Figure 8:
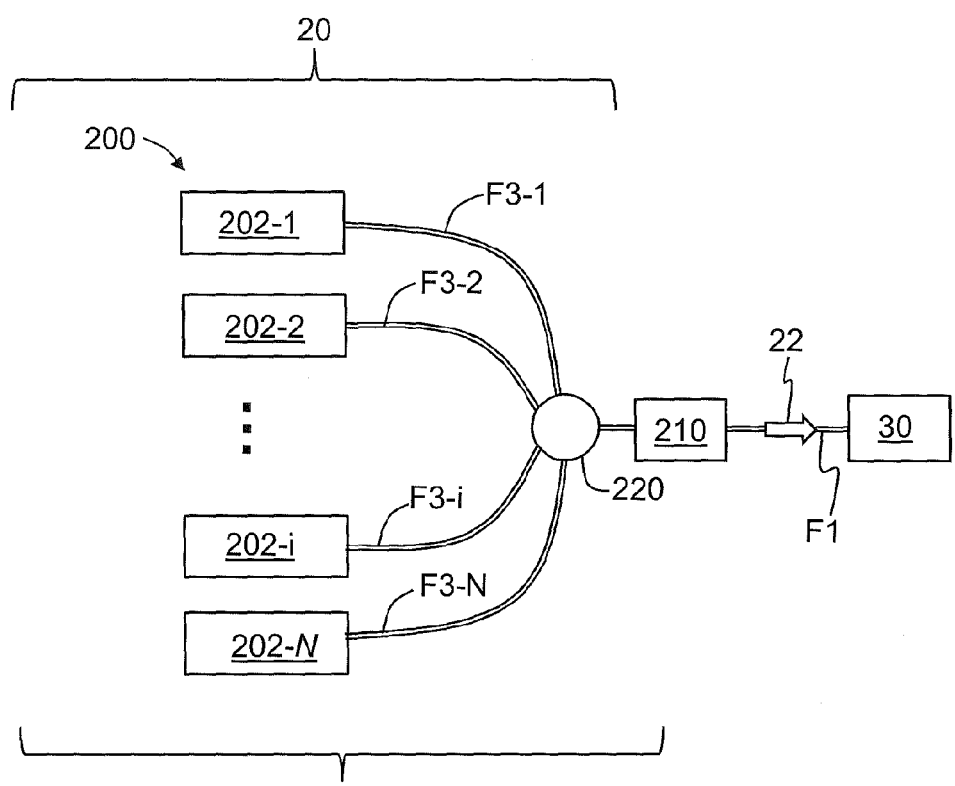
FIG. 8 is similar to FIG. 7, and illustrates another example embodiment of the light source wherein a single programmable polarization controller is used.

In an example, N×1 optical switch 220 is programmable. Polarization controllers 210 can be manual polarization controllers. FIG. 8 is similar to FIG. 7 and illustrates another example embodiment of light source 20 wherein a single programmable polarization controller 210 is used, with the polarization controller being arranged between the N×1 optical switch 220 and the modulator 30. Again, in the case where the optical fiber sections F1 and F3 are polarization-maintaining, programmable polarization controller 210 is not required.

Figure 9:
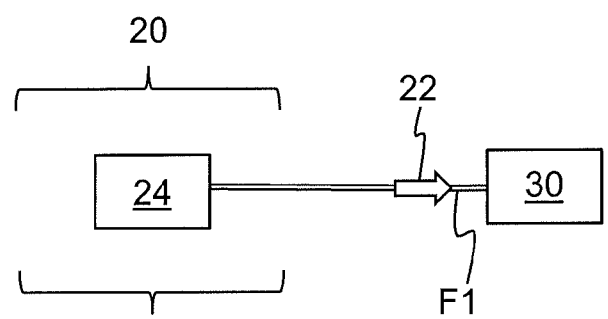
FIG. 9 is similar to FIG. 8 and illustrates an example embodiment wherein the light source has a single tunable light emitter.

FIG. 9 is similar to FIG. 8 and illustrates an example embodiment wherein light source 20 consists of a single tunable light emitter 24, which an example embodiment is a superluminescent diode. An example superluminescent diode emits from about 825 nm to about 874 nm in one unit or from 793 nm to 880 nm in another unit purchased later. This configuration makes for a relatively simple version of apparatus 10. In other cases, we can use tunable laser working from 1260 nm to 1360 nm to conduct multiple wavelength bandwidth measurement in that wavelength range.

Mode Conditioner Examples

In an example embodiment, mode conditioner 50 is an off-the-shelf device, such as the aforementioned ModCon mode controller sold by Arden Photonics, Ltd., West Midland, United Kingdom. An example commercial mode conditioner 50 employs a multimode fiber (e.g., 50 micron core radius) and generates a Gaussian light intensity profile radially across the multimode fiber core. The launch condition from this type of multi-mode mode conditioner can be similar to the launch condition from VCSEL.

Figure 10A:
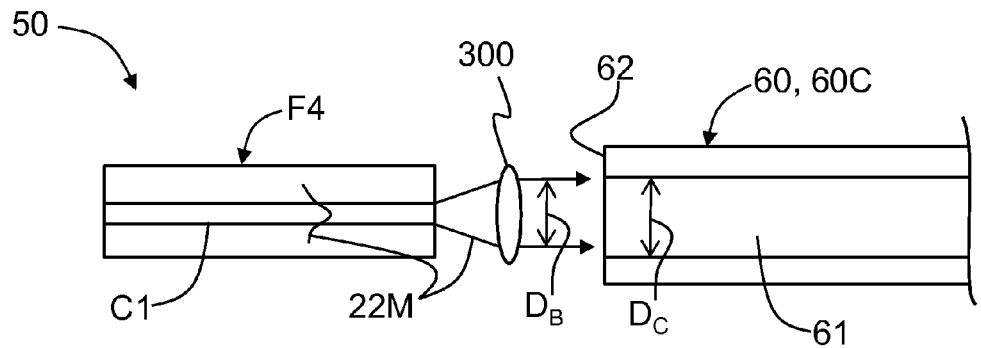
FIGS. 10A and 10B are schematic diagrams of example mode conditioners.

In another example embodiment, mode conditioner 50 is a customized device that is designed to provide select the launch conditions for various type of lasers and optics. FIG. 10A is a schematic diagram of an example mode conditioner 50 that employs a section F4 of single-mode optical fiber and a lens 300 operably arranged relative to fiber section F4 that includes a core C4. Fiber section F4 and lens 300 are configured to expand and collimate modulated light 22M (see also FIG. 1). Input end 62 of FUT 60 is operably arranged adjacent lens 300. FUT is shown has having a core 61 with a diameter $D_C$. The collimated modulated light 22M is sized to substantially match at least most of the size of core 61 (with spot size around half of the core diameter or greater) so that the light can be launched into the larger core of FUT 60 (or calibration fiber 60C) at input end 62 and excite a larger number of the multiple modes supported by the FUT. In an example, core 61 of FUT 60 has a diameter $D_C$ of nominally 25, 30, 40 or 50 microns and collimated modulated light beam 22M has a diameter DB that is between about 20 microns and 50 microns.

Figure 10B:
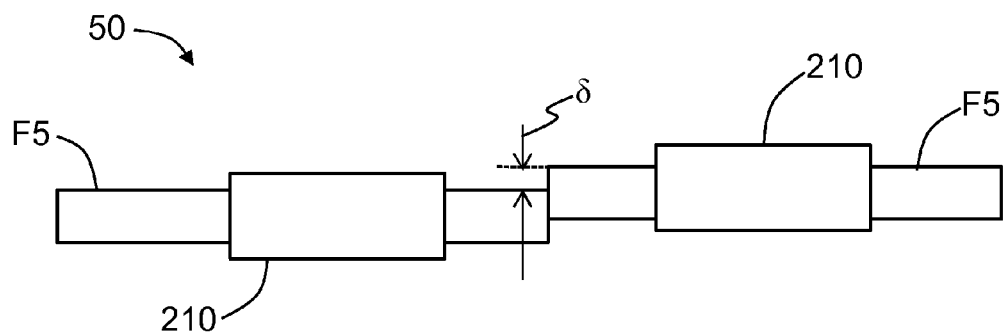

FIG. 10B is a schematic diagram of another example embodiment of mode condition 50 that employs two sections F5 of multimode fiber than can be offset by an amount δ with respect to each other. A fiber support members 210 can be used to support fiber sections F5 and provide a select offset δ relative to FUT 60, or the fiber sections can be spliced with a fixed offset. In an example, the offset δ is in the range from 1 to 20 microns. In an example embodiment, another mode conditioner 50 can be inserted upstream of fiber sections F5.

In other example embodiments, an offset-based mode conditioner 50 is configured to provide essentially arbitrary launch conditions to replicate the launch conditions that can occur as between a laser and a multimode fiber. For example, for an FUT 60 with a peak wavelength $\lambda_p$, of about 850 nm, to obtain the minEMBc bandwidth, a set of ten launch conditions can be used.

Figure 11A:
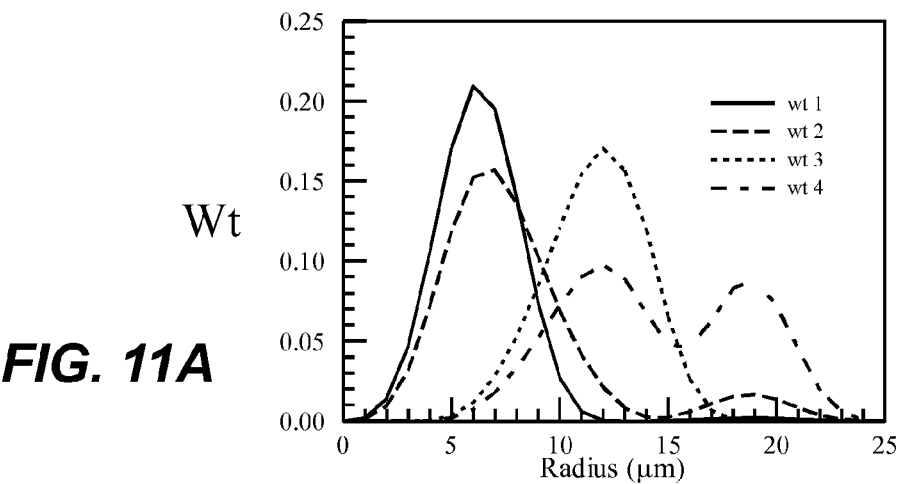
FIGS. 11A through 11C are plots of weight wt vs. radius ($\mu$m) for a number of different launching conditions defined by the mode conditioner.
Figure 11B:
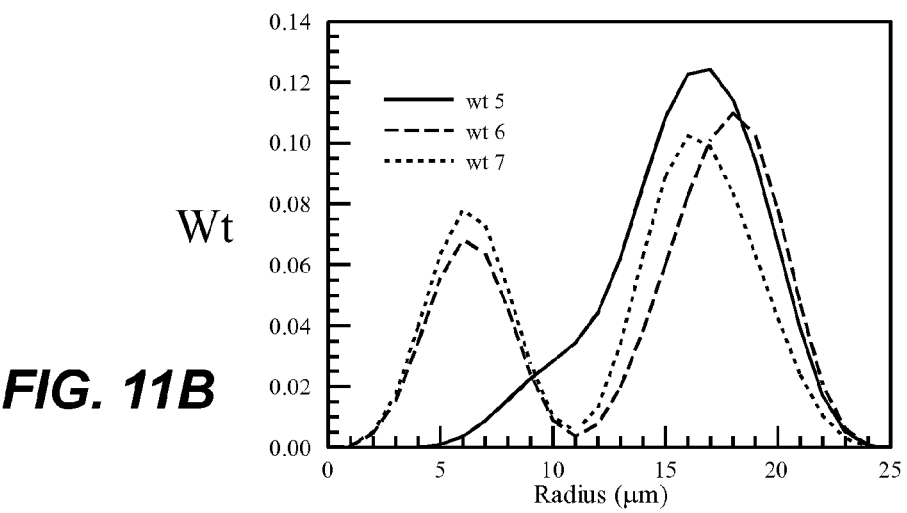
Figure 11C:
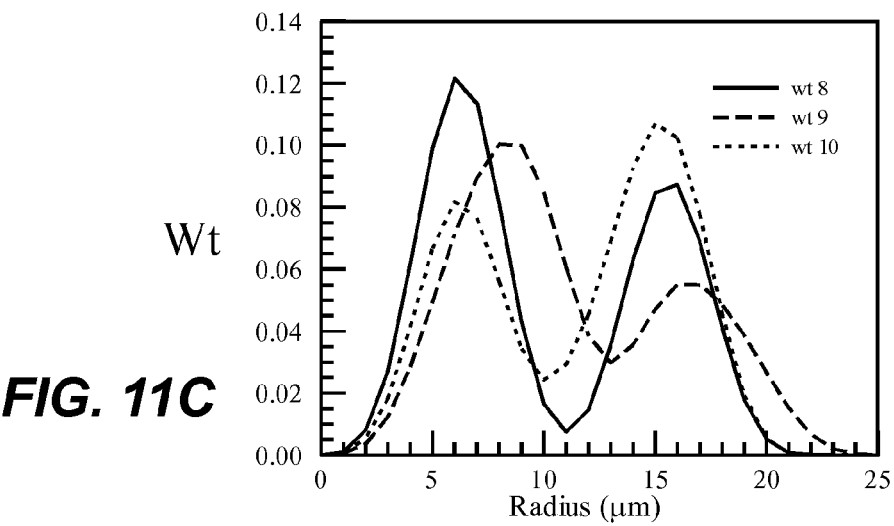

FIGS. 11A through 11C are plots the radius (μm) vs. weight "wt" for ten different launch conditions. FIG. 11A plots the results for "wt 1" through "wt 4," FIG. 11B plots the results for "wt 5 through wt 7," and FIG. 11C plots the results for "wt 8 through wt 10." The term "weight" is defined herein as the intensity weighted by the local area at a particular radial position. The area or the integration of the weight wt from 0 to 25 microns is 1 for a radius of 25 microns, meaning the total energy launched into the fiber is normalized. The launch conditions have an intensity profile proportional to the area near a particular radial position r. It can be found that any of the launch conditions has a light distributed in one or two radial regions of the core expanding from center of core at 0 micron to 25 microns, or the edge of the 50 micron diameter core.

Figure 12A:
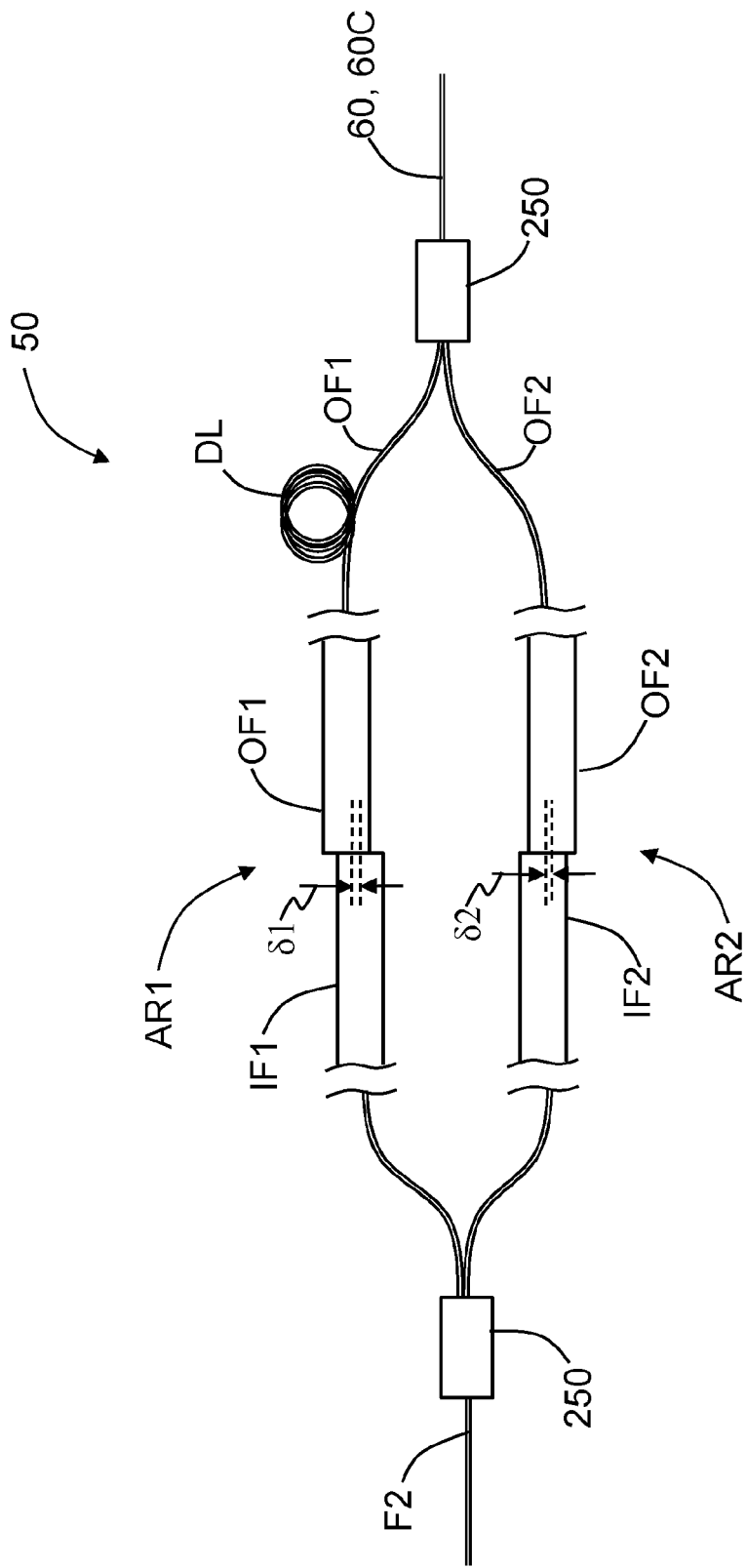
FIGS. 12A and 12B are exemplary mode conditioner that employs multiple offset optical fibers.
Figure 12B:
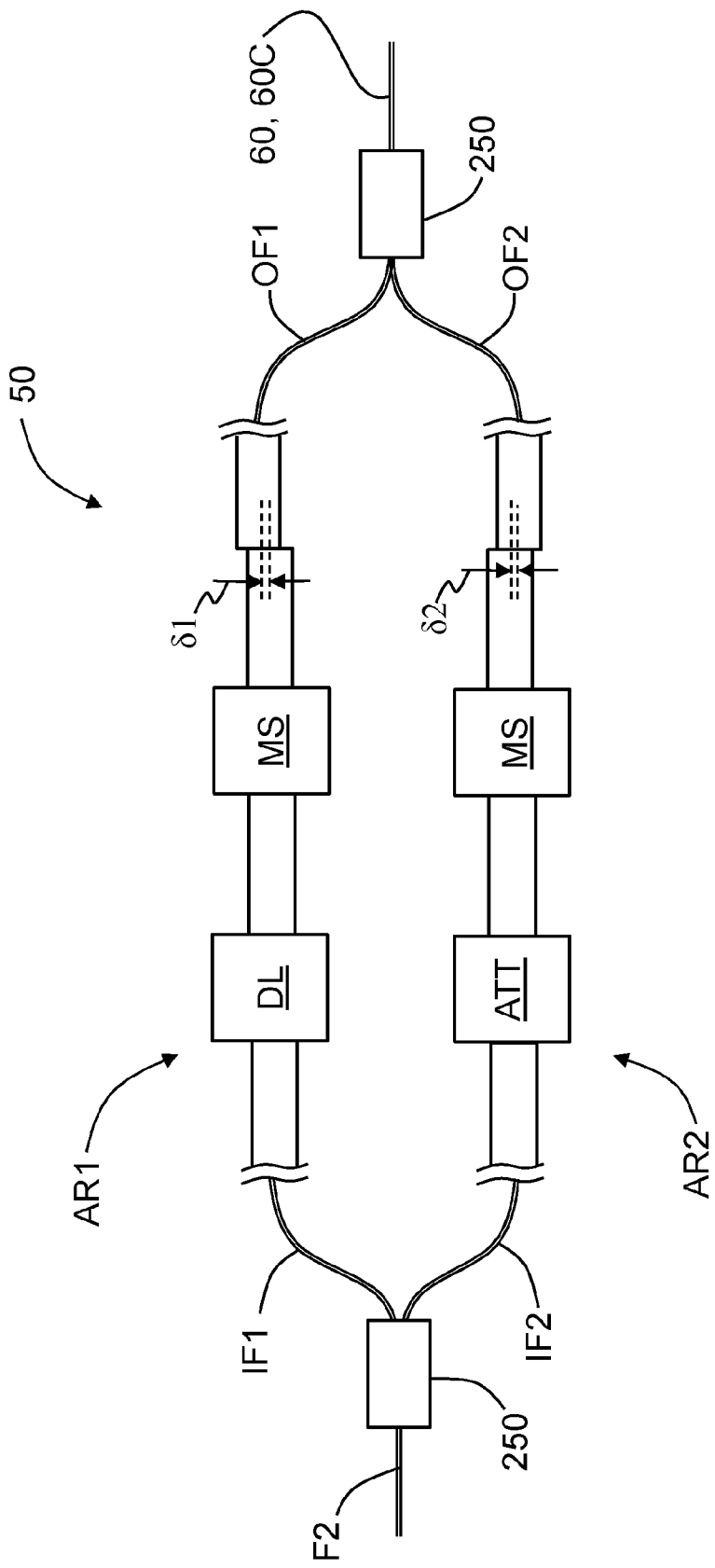

FIGS. 12A and 12B are schematic diagrams of example mode conditioners 50 that provides for adjustable launch conditions. Mode conditioner 50 includes a first multimode input fiber IF1 and a first multimode output fiber OF2 with a select offset δ1. Mode conditioner 50 also has a second multimode input fiber IF2 and a second multimode output fiber OF2 with an offset δ1. The two pairs of input and output fibers define first and second arms AR1 and AR2. The example mode conditioner 50 of FIG. 12A includes a delay line DL in output fiber OF1 to equalize the path lengths of the two arms AR1 and AR2.

Offset M can be fixed by tack splicing. The amount of offset δ1 is selected to ensure that the light will emit into a specific radial region of FUT 60. If another radial region of core 61 of FUT also needs to be excited, then the second input fiber IF2 and the second output fiber OF2 can be used to excite the other radial region. There is also a need to equalize the path lengths between the two arms so that the light from the input reach the output at the same time/delay. Also if multimode fibers are used for input fibers IF1 and IF2, then the fiber can be coiled in a few loops of diameter ranging from 3 mm to 30 mm or pressed from the side with multiple cylindrical objects such as paper clips with specific spacing and pressures to scramble the light to distribute among all radial regions of the fiber. Alternatively, the fiber can be placed between microbending rack that has a zig-zag structure with a range of curvature between 0.2 mm to 2 mm to excite and couple a wide range of modes within the fiber, thereby forming an example mode scrambler MS, such as shown in FIG. 12B. In an example, the two input fibers IF1 and IF2 have a core size varying from 5 μm to 25 μm radius. Variable attenuator can also be inserted into one arm of the mode conditioner to adjust the relative strength of light launched into each radial region.

The example mode conditioner 50 of FIG. 12A can have more than two arms AR1 and AR2 to create more complex launch conditions. For example, optical coupler 250 can be a N×1 coupler to couple N streams of light into FUT 60. Mode conditioner 50 can also be configured with a multimode fiber switch (not shown) to toggle between different launch conditions for measuring bandwidth of multimode fiber in multiple launch conditions.

The example mode conditional 50 of FIG. 12B includes in arm AR1 a delay line DL and a mode scrambler MS, and in arm AR2 includes an attenuator ATT and another mode scrambler MS.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of measuring a modal bandwidth BW(λ) as a function of wavelength of a multimode optical fiber under test, comprising:
   a) emitting polarized light from a single-mode fiber connected to a light source light at a select wavelength within a wavelength range;
   b) frequency-modulating the polarized light over a range of frequencies to form frequency-modulated polarized light;
   c) exciting multiple modes of the multimode optical fiber under test using the frequency-modulated polarized light, and transmitting the multiple modes through the multimode optical fiber under test to form transmitted light;
   d) detecting the transmitted light and calculating a first bandwidth $BW_1$ based on the detected transmitted light at a first wavelength $\lambda_1$; and
   e) repeating acts a) through d) for at least two more select wavelengths within the wavelength range to calculate second and third bandwidths $BW_2$ and $BW_3$ at wavelengths $\lambda_2$ and $\lambda_3$.

2. The method according to claim 1, wherein the light source comprises:
   a) a superluminescent diode; or
   b) a plurality of lasers each emitting a select wavelength; or
   c) a tunable laser.

3. The method according to claim 1, wherein the wavelength range has a width from 50 nm to 150 nm wide and resides within one of the following wavelength windows:
   i) 750 nm and 1650 nm;
   ii) 790 nm to 890 nm;
   iii) 1260 nm to 1360 nm; or
   iv) 1450 nm to 1600 nm.

4. The method according to claim 1, wherein the frequency modulation has a maximum of up to 60 GHz.

5. The method according to claim 1, wherein the optical fiber under test has a length from 100 m to 16.5 km.

6. The method according to claim 1, wherein exciting multiple modes of the multimode optical fiber under test included performing mode conditioning of single-mode light to define one or more launching conditions.

7. The method of claim 1, further comprising:
determining a calibration optical fiber transfer function (OFTF) by performing acts a) through e) using a multimode calibration optical fiber that has a length of 2 m or less; and
using the calibration OFTF, defining an adjusted OFTF, and using the adjusted OFTF to calculate bandwidths $BW_1$, $BW_2$, and $BW_3$.

8. The method according to claim 1, further comprising fitting the first, second and third bandwidths $BW_1$, $BW_2$ and $BW_3$ to a bandwidth versus wavelength relationship.

9. The method according to claim 8, wherein said relationship has the form $$BW(\lambda)=(0.2)/[a+c\cdot(\lambda-\lambda_p)^2]$$

wherein $\lambda_p$ is a peak wavelength of the multimode optical fiber under test, and a and c are constants.

10. The method according to claim 8, wherein the multimode optical fiber under test has a gradient refractive index profile characterized by a parameter α, further including determining from the bandwidth $BW(\lambda)$ at least one of an alpha-error and a non-alpha error.

11. A method of measuring a modal bandwidth $BW(\lambda)$ as a function of wavelength of a multimode optical fiber under test (FUT), comprising:
a) emitting polarized light of a first wavelength $\lambda_1$ from a single-mode fiber;
b) frequency-modulating the single-mode polarized light;
c) conditioning the frequency-modulated polarized light to excite multiple modes of the multimode FUT to form transmitted light;
d) detecting and analyzing the transmitted light to determine a first bandwidth $BW_1$; and
e) repeating acts a) through d) for at least two additional wavelengths $-\lambda_2$ and $\lambda_3$ to determine second and third bandwidths $-BW_2$ and $BW_3$.

12. The method according to claim 11, further comprising forming the single-mode polarized light using a tunable light source optically coupled to a single-mode optical fiber, wherein the single-mode optical fiber is polarization-maintaining.

13. The method according to claim 11 wherein the frequency modulating is performed using an optical modulator that receives a frequency control signal from a network analyzer.

14. The method of claim 11 further comprising:
determining a calibration optical fiber transfer function (OFTF) by performing acts a) through d) using a multimode calibration optical fiber that has a length of 2 m or less; and
using the calibration OFTF, defining an adjusted OFTF and using the adjusted OFTF to calculate the bandwidths $BW_1$, $BW_2$ and $BW_3$.

15. The method according to claim 11, further comprising:
f) using a bandwidth fitting equation to establish the modal bandwidth $BW(\lambda)$.

16. The method of claim 15, wherein the bandwidth fitting equation has peak value, a peak wavelength, and a width taken at a select fraction of the peak value.

17. The method according to claim 16, wherein the bandwidth fitting equation has the form $$BW(\lambda)=(0.2)/[a+c\cdot(\lambda-\lambda_p)^2]$$

wherein $\lambda_p$ is a peak wavelength of the multimode optical fiber under test, and a and c are constants.

18. An apparatus for determining a modal bandwidth $BW(\lambda)$ as a function of wavelength of a multimode optical fiber under test that has input and output ends, comprising:
a tunable light source adapted to emit light at first, second and third wavelengths $\lambda_1$, $\lambda_2$ and $\kappa_3$ within a wavelength range;
a single-mode optical fiber having an input end optically coupled to the light source to receive the light at an output end that emits single-mode light;
an optical modulator optically coupled to the output end of the single-mode optical fiber and that is operable to frequency modulate the single-mode light to form frequency modulated light in response to a frequency control signal;
a mode conditioner optically coupled to the optical modulator and to the input end of the optical fiber under test, the mode conditioner being operable to receive and condition the frequency-modulated light to excite multiple modes of the optical fiber under test to form transmitted light;
a photodetector optically coupled to the output end of the fiber under test and configured to receive the transmitted light and generate a detector signal representative of the transmitted light;
a network analyzer electrically connected to the photodetector and to the optical modulator and configured to provide the frequency control signal to the optical modulator and configured to receive and process the detector signal to calculate bandwidth values $BW_1$, $BW_2$ and $BW_3$ corresponding to the first, second and third wavelengths $\lambda_1$, $\lambda_2$ and $\lambda_3$; and
a controller operably connected to the network analyzer and configured with instructions embodied in a computer-readable medium to cause the controller to perform a fit to a bandwidth fitting equation to define the bandwidth $BW(\lambda)$.

19. The apparatus of claim 18, wherein the tunable light source comprises:
a) a superluminescent diode; or
b) a plurality of lasers each emitting a select wavelength; or
c) a tunable laser.

* * * * *